United States Patent
Drew

(10) Patent No.: US 7,660,199 B2
(45) Date of Patent: Feb. 9, 2010

(54) MICROSEISMIC EVENT DETECTION AND LOCATION BY CONTINUOUS MAP MIGRATION

(75) Inventor: Julian Drew, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/143,841

(22) Filed: Jun. 23, 2008

(65) Prior Publication Data

US 2008/0259727 A1    Oct. 23, 2008

Related U.S. Application Data

(63) Continuation of application No. 10/943,754, filed on Sep. 17, 2004, now Pat. No. 7,391,675.

(51) Int. Cl.
*G01V 1/24*    (2006.01)
(52) U.S. Cl. .......................................... 367/40; 367/73
(58) Field of Classification Search .................. 367/31, 367/38, 40, 73; 166/250.1
See application file for complete search history.

(56) References Cited

U.S. PATENT DOCUMENTS

| | | |
|---|---|---|
| 4,422,165 A | 12/1983 | Thomas et al. |
| 4,516,206 A | 5/1985 | McEvilly |
| 4,649,524 A | 3/1987 | Vance |
| 4,868,657 A | 9/1989 | Samuels |
| 5,010,527 A | 4/1991 | Mahrer |
| 5,747,750 A | 5/1998 | Bailey et al. |
| 5,771,170 A | 6/1998 | Withers et al. |
| 5,774,419 A | 6/1998 | Uhl et al. |
| 5,917,160 A | 6/1999 | Bailey |
| 5,934,373 A | 8/1999 | Warpinski et al. |
| 5,963,508 A | 10/1999 | Withers |
| 5,996,726 A | 12/1999 | Sorrells et al. |
| 6,748,330 B2 | 6/2004 | Leaney |
| 6,947,843 B2 | 9/2005 | Fisher et al. |
| 6,985,816 B2 | 1/2006 | Sorrells et al. |

FOREIGN PATENT DOCUMENTS

WO    2004/070424    8/2004

OTHER PUBLICATIONS

Vance, et al. "Improved Determination of Microseismic Source Location Using a Simplex Technique." IEEE Transactions of Industry Applications, vol. 24, No. 4, Jul./Aug. 1988.*

"http://geoazur.unice.fr/PERSO/lomax/nlloc/, The NonLinLoc Software Guide".

Urbancic, et al. "Mapping Hydraulic Fracture Complexities Using Microseismicity", NARMS 2002.

(Continued)

*Primary Examiner*—Scott A Hughes
(74) *Attorney, Agent, or Firm*—Matthias Abrell; Jaime Castano; Dale Gaudier

(57) ABSTRACT

The present invention provides methods and systems for microseismic hydraulic fracture monitoring in real-time. The methods and systems of the present invention may include continuous map migration of recorded microseismic signals. The methods and systems provide robust automated simultaneous detection and location of microseismic events.

22 Claims, 13 Drawing Sheets

OTHER PUBLICATIONS

Rowe, et al. "Using Automated, High Precision Repicking to Improve Delineation of Microseismic Structures at the Soultz Geothermal Reservoir," Pure and Applied Geophysics, 2002.

Moriy, et al. "Multiplet-clustering Analysis Reveals Structural Details within eismic Cloud at the SouItz Geothermal Field, France," Bull. Seism. Soc. Am. Aug. 2003.

Harris, et al."Mapping Acoustic Emissions from Hydraulic Fracture Treatments Using Coherent Array Processing: Concept," Sep. 1991.

S.C. Maxwell, et al., "Real-Time 4D Passive Seismic Imaging of Hydraulic Fracturing", SPE/ISRM 78191.

Kao, Honn and Shan, Shao-Ju, "The Source-Scanning Algorithm: Mapping The Distribution of Seismic Sources in Time and Space", Geophysical Journal International, 2004, pp. 589-594, vol. 157.

Baziw, at al. "Microseismic event detection Kalman Filter: Derivation of the Noise Covariance Matrix and Automated First Break Determination for Accurate Source Location Estimation." Pure and Applied Geophysics, Feb. 2004.

Kosteniuk, et al. "Automated Microseismic Event Analysis", CIM Meeting, Calgary 1999.

Ge, et al. "Practical application of an innovative microseismic source location procedure", Geotechnical and Geological Engineering. 1992.

Yi, at al., "Automatic seismic wave detection and autoregressive model method", Mathematical Geology, Springer Netherlands, vol. 20, No. 1, Jan. 1998.

* cited by examiner

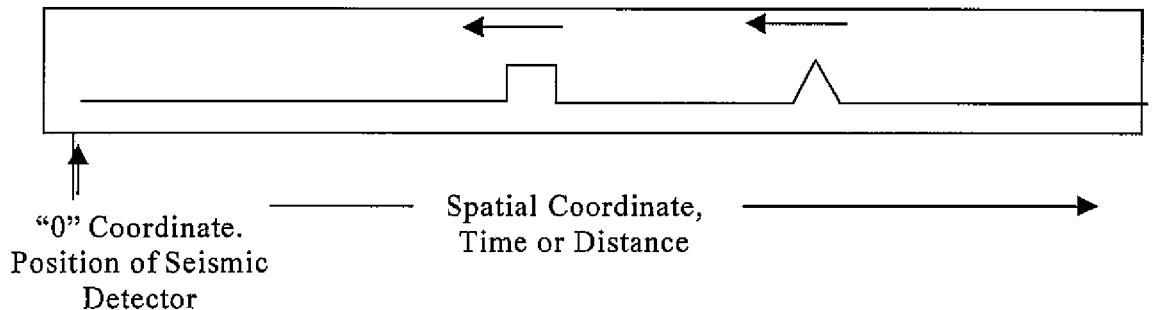
FIG. 6
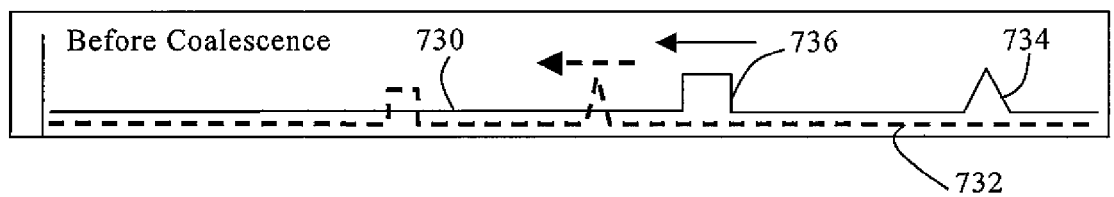
Fig. 7A
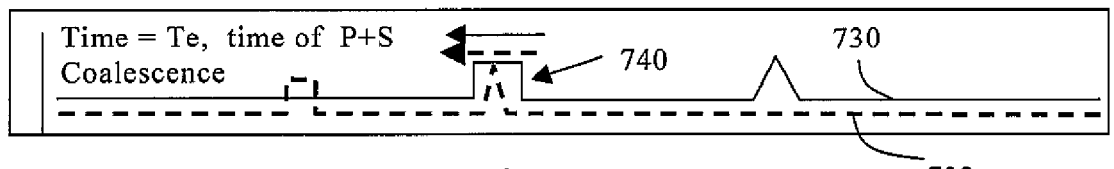
Fig. 7B
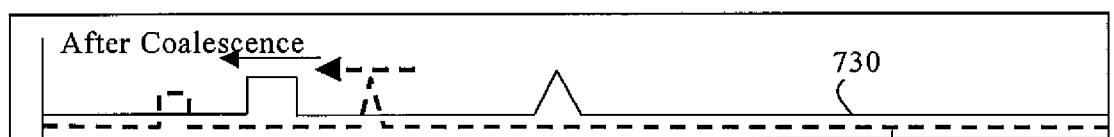
Fig. 7C
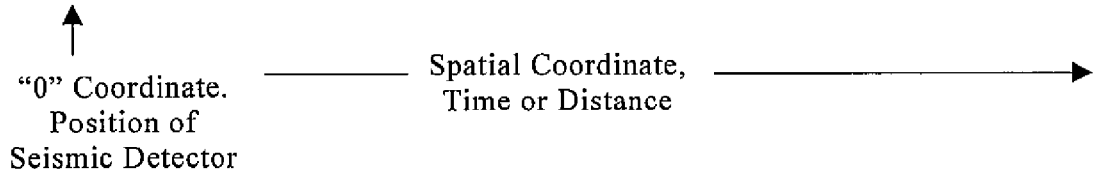

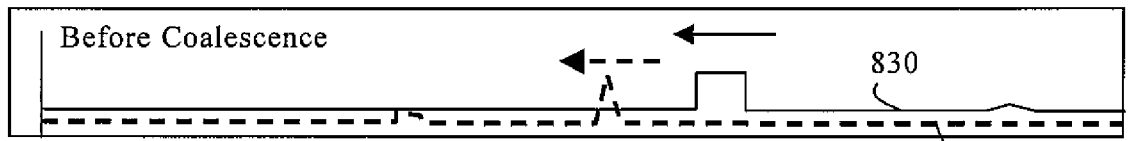
Fig. 8A
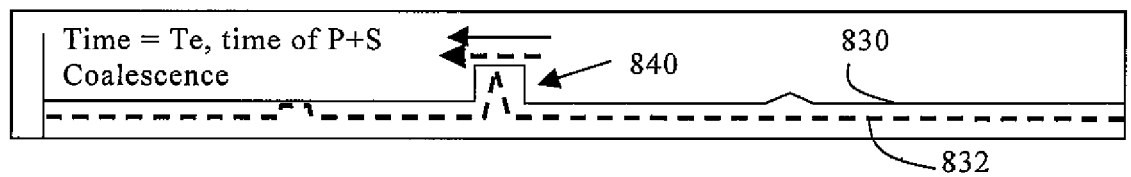
Fig. 8B
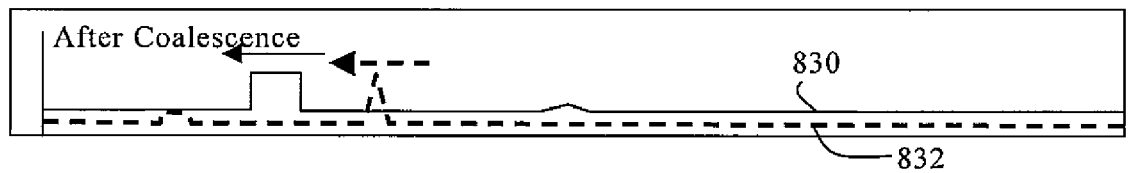
Fig. 8C
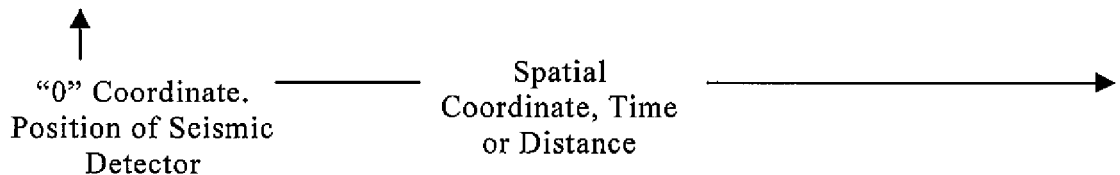

↑
"0" Coordinate.
Position of
Seismic Detector

Spatial
Coordinate, Time
or Distance →

MICROSEISMIC EVENT DETECTION AND LOCATION BY CONTINUOUS MAP MIGRATION

CROSS REFERENCE TO RELATED APPLICATIONS

This is a continuation application of co-pending U.S. patent application Ser. No. 10/943,754 filed 17 Sep. 2004 and entitled "Microseismic Event Detection and Location By Continuous Map Migration," which is hereby incorporated in its entirety by this reference.

FIELD OF THE INVENTION

The present invention relates generally to methods and systems for investigating subterranean formations. More particularly, this invention is directed to methods and systems for detecting and locating microseismic events by continuous map migration.

BACKGROUND OF THE INVENTION

In order to improve the recovery of hydrocarbons from oil and gas wells, the subterranean formations surrounding such wells can be hydraulically fractured. Hydraulic fracturing is used to create small cracks in subsurface formations to allow oil or gas to move toward the well. Formations are fractured by introducing specially engineered fluids at high pressure and high flow rates into the formations through the wellbores. Hydraulic fractures typically extend away from the wellbore 250 to 750 feet in two opposing directions according to the natural stresses within the formation.

The fracture fluids are preferably loaded with proppants, which are usually particles of hard material such as sand. The proppant collects inside the fracture to permanently "prop" open the new cracks or pores in the formation. The proppant creates a plane of high-permeability sand through which production fluids can flow to the wellbore. The fracturing fluids are preferably of high viscosity, and therefore capable of carrying effective volumes of proppant material.

Recently, there has been an effort to monitor hydraulic fracturing and produce maps that illustrate where the fractures occur and the extent of the fractures. Current hydraulic fracture monitoring comprises methods of processing seismic event locations by mapping seismic arrival times and polarization information into three-dimensional space through the use of modeled travel times and/or ray paths. Travel time look-up tables may be generated by modeling for a given velocity model. A typical mapping method is commonly known as the "Non-Linear Event Location" method. Non-linear event location has been used historically to locate macro seismic events such as earthquakes, and is described, for example, at http://geoazur.unice.fr/PERSO/lomax/nlloc/. This and other equivalent methods are referred to herein as non-linear event location methods.

The non-linear event location methods involve the selection and time picking of discreet seismic arrivals for each of multiple seismic detectors and mapping to locate the source of seismic energy. However, to successfully and accurately locate the seismic event, the discrete time picks for each seismic detector need to correspond to the same arrival of either a "P" or "S" wave and be measuring an arrival originating from the same microseismic or seismic event. During a fracture operation, many hundreds of microseismic events may be generated in a short period of time. Current techniques employed in the industry require considerable human intervention to quality control the time picking results. It can often take weeks from the time of recording and detecting the microseismic events to produce accurate maps of the event locations. Even so, the result, which requires human interaction and interpretation, can lead to multiple and non-reproducible solutions.

Therefore, current methods of real-time monitoring and modeling of fracture growth are typically based on pumping and pressure data, which provides very limited information concerning the geometry of fracture growth. There is a need for microseismic event detection and location that can be implemented in real time and enable an operator to adjust hydraulic fracture parameters during the fracture job.

SUMMARY OF THE INVENTION

The present invention meets the above-described needs and others. Specifically, the present invention provides methods and systems for hydraulic fracture microseismic monitoring in real-time. The methods of the present invention may include continuous map migration of recorded microseismic signals. The methods and systems provide robust automated simultaneous detection and location of microseismic events.

The methods and systems of the present invention may be applied to any microseismic operation relating to subterranean formations, including, but not limited to hydraulic fracture operations. Application of the principles of the present invention provides a method comprising monitoring microseismicity. The monitoring comprises receiving seismic signals with seismic detectors and generating a time evolving historical map of microseismic activity by mapping based on the seismic signals.

According to one aspect of the disclosure a method of detecting and locating a microseismic event is disclosed. The method includes providing an estimate of space for a location of a source, providing an estimate of a velocity model for a formation, receiving data of a microseismic event with a first seismic sensor located on a tool in a wellbore, receiving data of the microseismic event with a second seismic sensor located on the tool, selecting an instant in time, selecting a plurality of locations in the estimated space, determining whether the data received by the first sensor and the data received by the second sensor coalesce at any of the selected locations at the instant, and determining the location of the source.

According to another aspect of the disclosure a method of detecting and locating a microseismic event is disclosed. The method includes providing an estimate of space for a location of a source of the microseismic event, the estimate being at least partially based on a estimated relative location of a tool and the microseismic event, providing an estimate of a velocity model for a formation, receiving data of the microseismic event with a first and a second seismic sensor located on the tool in a wellbore, the data including at least a P-wave and an S-wave component, selecting at least a first and a second instant in time, attempting to coalesce the signal received by the first and the second sensors at the first instant in time at a plurality of locations in the space, attempting to coalesce the signal received by the first and the second sensors at the second instant in time at the plurality of locations in the space, coalescing the signal received by the first and the second sensors, and determining the location of the source.

According to another aspect of the disclosure a method of detecting and locating a microseismic event is disclosed. The method includes providing an estimate of space for a location of a source of the microseismic event, providing an estimate of a velocity model for a formation, receiving data of the microseismic event with a first and a second seismic sensor located on the tool in a wellbore, automatically selecting at least a first and a second instant in time, automatically attempting to coalesce the signal received by the first and the second sensors at the first instant in time at a plurality of locations in the space, automatically attempting to coalesce the signal received by the first and the second sensors at the second instant in time at the plurality of locations in the space, automatically coalescing the signal received by the first and the second sensors, and automatically determining the location of the source.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 6 is a trivial 1D time evolution map of a seismic signal received by a single seismic detector according to one aspect of the present invention.

FIG. 7A is an example of a time evolution map prior to maximum spatial coalescence using a single seismic detector according to one aspect of the present invention.

FIG. 7B is the time evolution map of FIG. 7A at maximum spatial coalescence.

FIG. 7C is the time evolution map of FIG. 7A after maximum spatial coalescence.

FIG. 8A is an example of a time evolution map prior to maximum spatial coalescence using a multiple seismic detectors according to one aspect of the present invention.

FIG. 8B is the time evolution map of FIG. 8A at maximum spatial coalescence.

FIG. 8C is the time evolution map of FIG. 8A after maximum spatial coalescence.

Throughout the drawings, identical reference symbols designate similar, but not necessarily identical, elements.

DETAILED DESCRIPTION OF THE PREFERRED EMBODIMENTS

Figure 1:
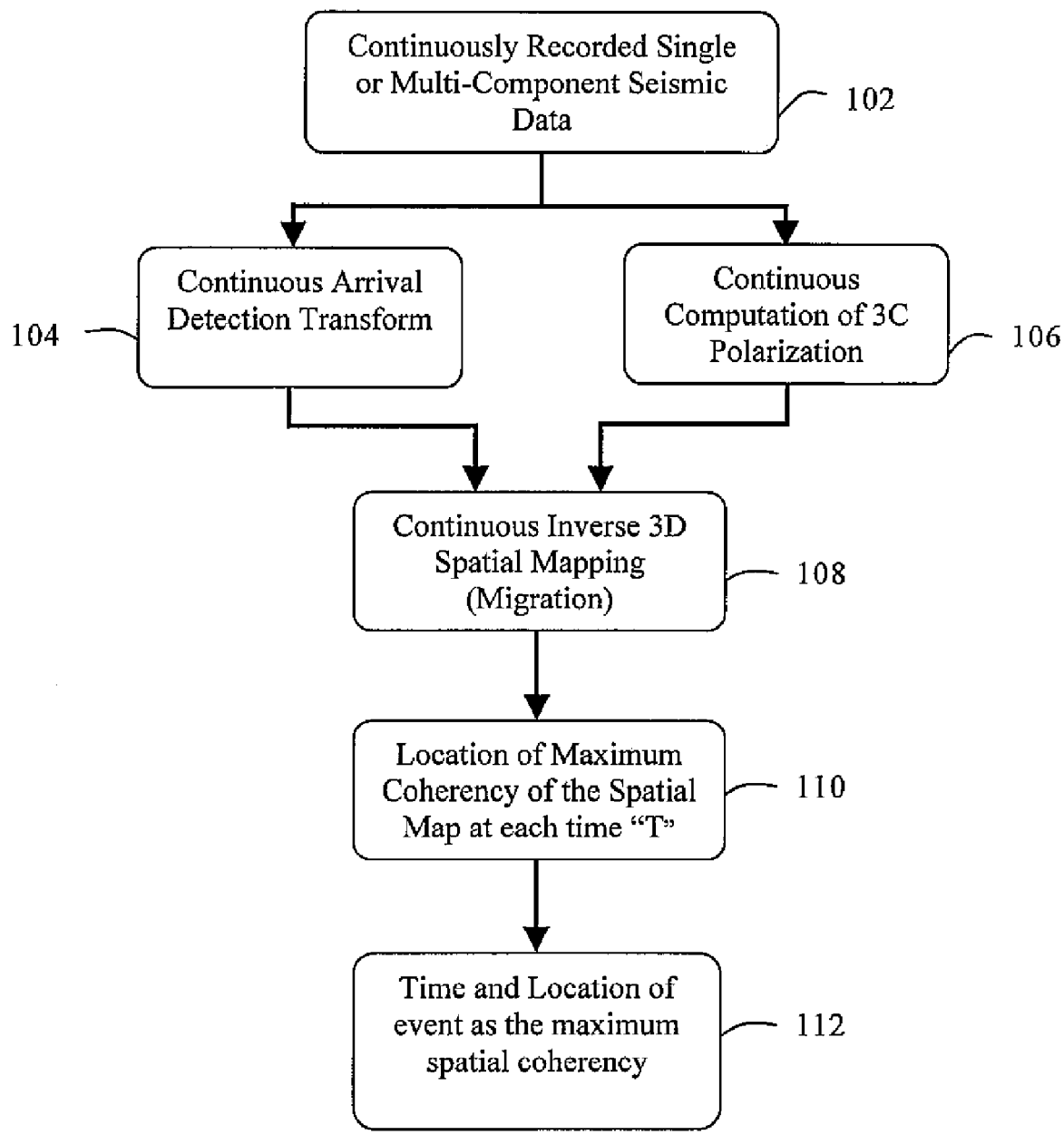
FIG. 1 is a flowchart illustrating a method or process of microseismic monitoring according to one aspect of the present invention.

Illustrative embodiments and aspects of the invention are described below. It will of course be appreciated that in the development of any such actual embodiment, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the terms "automatic" or "automated" means without human intervention or interpretation. "Coalesce" or "coalescence" means coming together of different measures into a map such as a spatial map. Coalescence also means evaluating the time evolving contributions from multiple sensors or components, but does not include non-linear event location methods. The terms "coalesce" or "coalescence" may be further understood in reference to the FIGS. 7A-10C below. A "sensor" defines a single device location that may have one or more "detectors" capable of receiving measurements at the same location. The words "including" and "having," as used in the specification, including the claims, have the same meaning as the word "comprising."

The present invention contemplates real-time monitoring and modeling of fracture growth. The methods and systems provided herein facilitate transforming microseismic signals as recorded by one or more seismic detectors and transforming the signal to enhance detection of arrivals. Thereafter, the methods and systems map or migrate the transformation result using a set of travel time and ray direction look-up tables. This map or migration generates a continuously updated two-dimensional or three-dimensional historical spatial map, such that a snapshot of the map represents a measure of the likelihood that there was a source of seismic energy occurring at that time, at each point in space.

According to aspects of the present invention, the time evolution of the map is captured, and by evaluating maximum values of the map that exceed a detection threshold, a determination is made whether a source of seismic energy or an event occurred at a given time and location. By choosing a function that coalesces or correlates the contributions from each detector, seismic sources characterized by P-wave, S-wave, or sources generating both P and S-waves, can be distinguished. The wave types may be distinguished, for example, by considering that P and S waves have different travel times and different waveform polarization.

According to some aspects of the invention, detecting a time and determining a unique location for a seismic event is dependent on the number of seismic detectors used, the relative positions of the detectors, and a choice of functions used to coalesce or correlate the contributions of the detectors. The resulting map at the time of the event captures the uniqueness of the determined location.

The mapping to generate an evolving historical map of the sources of seismic energy according to principles of the present invention offers many advantages over traditional methods of detecting and time picking arrivals for individual seismic detectors. Some of the advantages are discussed below. For example, the methods and systems of the present invention may be fully automated and able to operate continuously in time for monitoring, detecting, and locating microseismic events. Methods of the present invention utilize the contributions from one or multiple seismic detectors. By coalescing or correlating the contributions from multiple seismic detectors, events may be detected and located that could not otherwise be detected, time picked, and located by traditional methods that analyze only the signal of individual seismic detectors. Methods of the present invention may be adapted by changing a coalescence function to detect events characterized by difference source parameters. The principles of the present invention capture the uniqueness of an event location as characterized by the seismic measurement, the seismic detector geometry, and the choice of coalescence function. Accordingly, methods of the present invention reduce the solution for complex geometry, geology, and geophysical models to the generation and use of forward modeled travel times and ray paths that are generated by any of the appropriate and well studied methods of geophysical modeling. The principles of the present invention also eliminate the need for interactive and manual discreet arrival detection and accurate time picking characterized by prior methods. The process of selecting and time picking equivalent arrivals for a number of seismic detectors can be difficult to automate, and often requires a time consuming interactive and interpretive process.

Turning now to the Figures, and in particular to FIG. 1, a method or process of monitoring microseismic events according to one embodiment of the present invention is illustrated by flowchart. According to the process illustrated in FIG. 1, the process can be performed on continuous data or on a semi-continuous basis using short time windows of data, which is represented by a box 102. The method contemplates a sequence of transforms which may include continuous arrival detection transforms 104 and/or continuous computation of three-component (3C) polarization 106. Following the transforms, mapping or migration 108 takes place. The mapping process outputs a continuous value representing a maximum coalescence from a spatial map, along with a location of the maximum coalescence 110. The time and location of maximum coalescence above a detection threshold corresponds to a measured time and location that an event is reported to have occurred as indicated at 112.

According to some aspects of the present invention, the continuous arrival detection transform 104 discounts a signature of the recorded seismic signal and enhances arrival detection. Therefore, the transform may involve cross correlation and deconvolution (filtering) to enhance or measure a signal with a particular wave shape. The transform may also include arrival detection algorithms or any simple measure of an arrival such as waveform energy or unsigned waveform amplitude. If only an accurate measure of location of an event is required, the detection transform may be any measure of the first arrival signal, as long as the measurement provides the same response for each of the seismic detectors. Obtaining accurate timing of the event requires knowledge of how the detection transform relates to the timing of the first arrival, but is otherwise unnecessary according to this method.

One exemplary transform that may be used is a variation of the STA/LTA (Short Term Averaging to Long Term Averaging) detection criteria, utilizing a Hilbert envelope as described in U.S. Pat. No. 6,748,330, which is hereby incorporated in its entirety by this reference. The STA/LTA method and variations of the method are well known to those of skill in the art having the benefit of this disclosure and are commonly used to enhance an arrival for automatic arrival detection and time picking methods. However, any method, including methods that make use of multi-component rectilinearity or enhance or detect arrivals by considering changes in signal spectra may also be used. See, for example, Moriya, H. et. el., 1996.

Nevertheless, unlike conventional methods, according to principles of the present invention the detection criteria is not directly used to detect and time pick or identify any particular arrival signal. Rather, the result is continuously mapped into 2D or 3D space using modeled travel times. The detection is then made on the changing 2D or 3D map, which is the result of the contributions from one or multiple seismic detectors located on one or more sensors.

According to some embodiments wherein there is a sufficient number of suitably located seismic detectors, a unique location of the microseismic energy can be determined whether the source is identified, modeled, and mapped as strictly a P-wave seismic source, strictly an S-wave seismic source, or a multi-phase seismic source. Uniquely determining a 3D location using the arrival times of a single phase (P or S) requires a minimum measure of four arrival times. This is the equivalent phenomenon found in GPS positioning. The four measurements determine the four unknowns: time and the three spatial coordinates. The four sensors need to be suitably located in space (i.e. they cannot all lie in one plane). However, making an assumption about the location of the source (e.g. fixing that the source was generated on a 2D plane) or fixing the time of the source by another measurement (e.g. electromagnetic timing of an event) the number of seismic detectors required to determine a unique location may be reduced to three.

In some cases, the seismic source is known to generate both P and S seismic energy. This information may be used to further constrain the mapping and determination of source location. Therefore, a smaller number of more simply located seismic detectors may be sufficient to determine a unique location of the source of microseismic energy and map a hydraulic fracture. A single 3C (three-component) or 4C (four-component) detector capable of measuring P-wave polarization (direction of the event) and the P and S arrival time (distance of the event) may determine the location of the event. Using one 3C detector, two possible solutions may be found without making further assumptions about the general direction of the source. Using a 4C detector or adding one or more seismic detectors, a single unique location may be determined. These principles will be well understood by those of skill in the art of locating microseismic events having the benefit of this disclosure.

Figure 2:
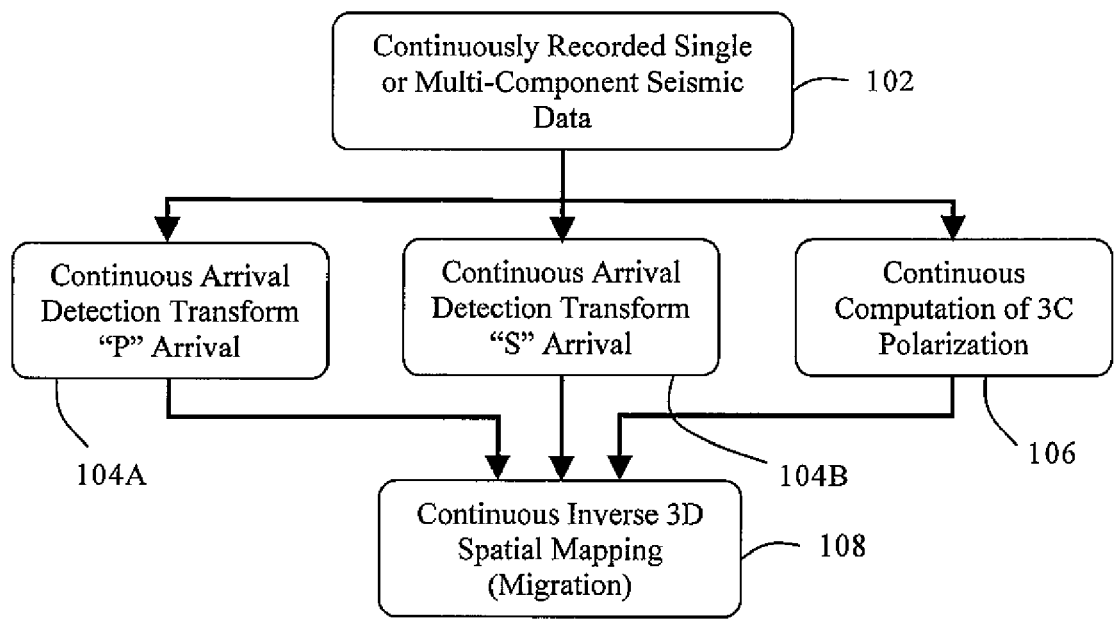
FIG. 2 a partial expansion of the flowchart illustrated in FIG. 1 showing an expansion of the continuous arrival detection transform according to one aspect of the present invention.

According to one exemplary arrangement illustrated by the flowchart of FIG. 2, a continuous moving window STA/LTA detection transform is applied to a measured seismic signal for each of a vertical array of eight, 3C seismic detectors such that the transform is sensitive to either a P arrival 104A or an S arrival 104B. The transform 104A/104B is sensitized to either P or S arrivals by taking an expected P waveform projection and the expected Sh projection for each of the 3C seismic detectors, assuming the source location is in a given general direction. Accordingly, the detectability of seismic events is enhanced.

According to another example implementing principles of the present invention, the polarization 106 of the 3C detected seismic signal may be computed on a continuous basis by using a moving window covariance analysis and eigenvector decomposition. The waveform polarization 106 can be used for the mapping in addition to the arrival detection criteria. By comparing a forward modeled P wave arrival and the computed 3C polarization of the seismic waveform at each location on the 3D map, the contribution or coalescence can be weighted by the match in modeled ray-direction and waveform 3C polarization. For example, a weighting function given by the P polarization and model match determines the azimuth of the event location relative to the vertical detector array described above. For a vertical array of seismic sensors S (each of which has one or more detectors) such as the ones shown in FIG. 14, a unique location for the event is not otherwise determinable.

As shown in FIG. 1, at each time step, T=T0, a 3D spatial mapping or migration is made for the detection criteria and optionally the 3C P-wave polarization. The mapping is preferably made via a set of forward-modeled travel time and ray-traced look-up tables. The time evolution of the mapping may utilize a time constant, Tc, and operate recursively to allow contributions from multiple sensors to sum up in space and over time.

At a given time $T_0$, the contribution to the spatial location $X_i$, $Y_j$, $Z_k$ is given as the sum of the contributions of the detection criteria from each of a number of multi-component seismic detectors. According to some aspects, the product of the P and S detection criteria is used, weighted by the match of modeled and measured P wave polarization. The time step evolution and contribution for one seismic detector is then given as:

$$\text{Map}(i, j, k) = \left(1 - \frac{1}{T_c}\right) * \text{Map}(i, j, k) + \frac{1}{T_c} * \text{P\_SNR} * \text{S\_SNR} * \text{P\_Match} \quad (1)$$

Where:
P_SNR=P Detection SNR at time $T_0+T_p(i, j, k)$;
S_SNR=S Detection SNR at time $T_0+T_s(i, j, k)$; and
P_Match=dot (Modeled_P_Vector $(i, j, k)$, Waveform Vector $(T_0+T_p(i, j, k))^2$ For multiple seismic detectors, the P_SNR*S_SNR*P_Match is summed, thereby summing the spatial contribution of each receiver at each location at each time step.

The recursive equation (1) is a computationally efficient method of a more general method using the sum of time windowed weighted contributions, using a time windowing function such as a hanning window. The purpose of applying a time windowing function, or a recursive time constant "Tc" as described above, is so that the contributions of the multiple measures from the one or more sensors do no miss each other in space, due to inaccuracies in the modeled travel times used in the mapping.

The contribution function defined by equation (1) used as a measure of the coalescence of P and S arrivals for the array of multi-component seismic detectors is not unique. Any function that takes into account the contribution as the sum, product, or power of the contribution of the P, S, or both the P and S detection criteria, as well as optionally a measure of the match between the forward modeled and measured 3C polarization, may be used.

The choice of a contribution or correlation function depends on the desired sensitivity to P only, S only, or P+S only seismic sources. According to one exemplary embodiment, by using and detecting only seismic sources which have both a P and an S arrival, the location as measured by the single vertical array of seismic detectors is better constrained.

Figure 3:
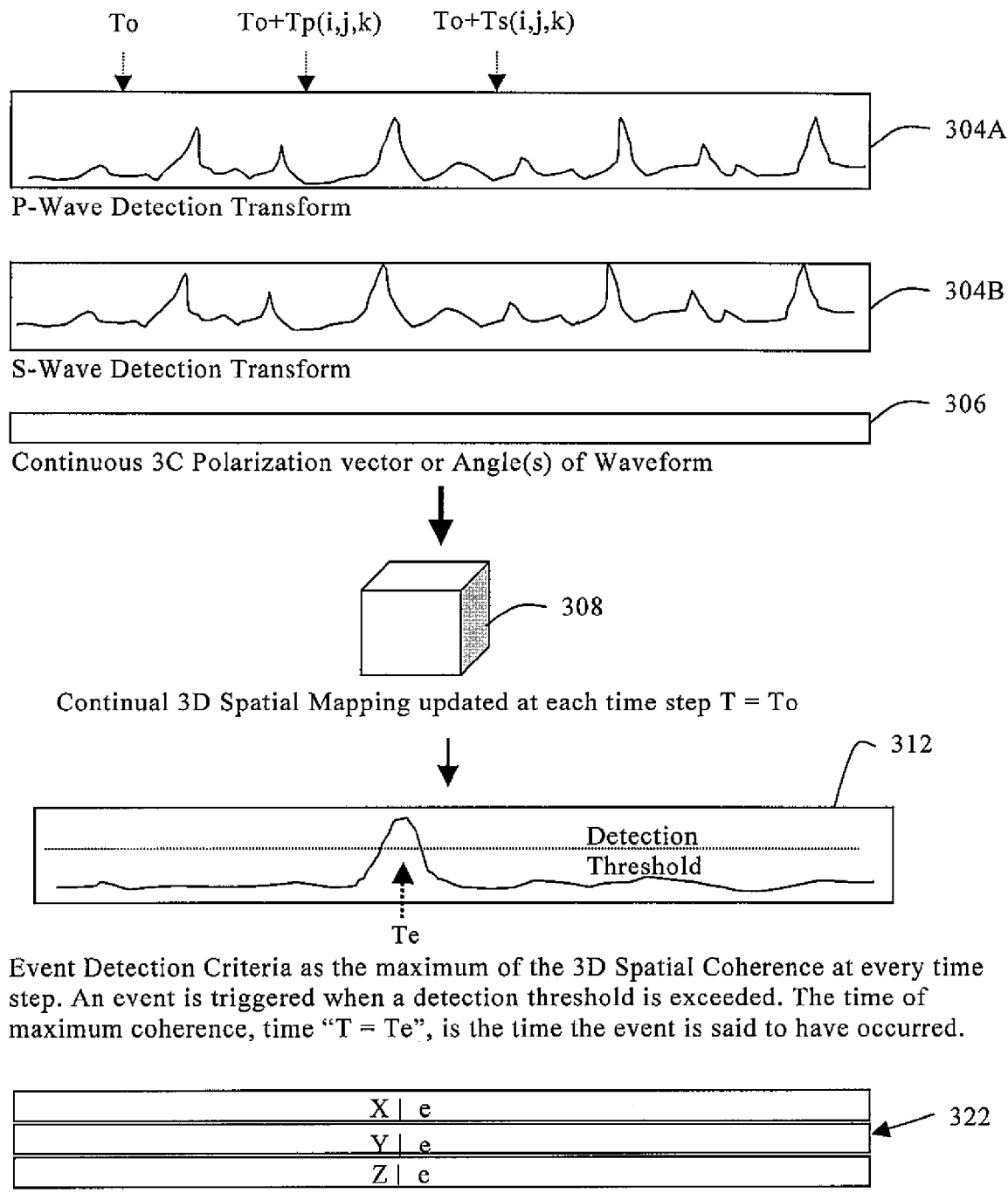
FIG. 3 is an illustration of sample waveforms and an application of monitoring functions to the waveforms according to some aspects of the present invention.

The process described above is illustrated in FIG. 3, which shows an exemplary P-wave detection transform 304A, an S-wave detection transform 304B, and a continuous 3C polarization vector or angles of waveform polarization 306. Continual 3D spatial mapping 308 follows and is updated at each time step T=T0. Event detection criteria 312 is the maximum of the 3D spatial coalescence at every time step. A seismic event is triggered when a detection threshold is exceeded. The time of maximum coalescence, time T=Te, is the time the event occurred. The X, Y, and Z locations of the maximum 3D spatial coalescence for each time T is stored. The detected event location Xe, Ye, Ze is given at time T=Te as illustrated in table 322.

Figure 4:
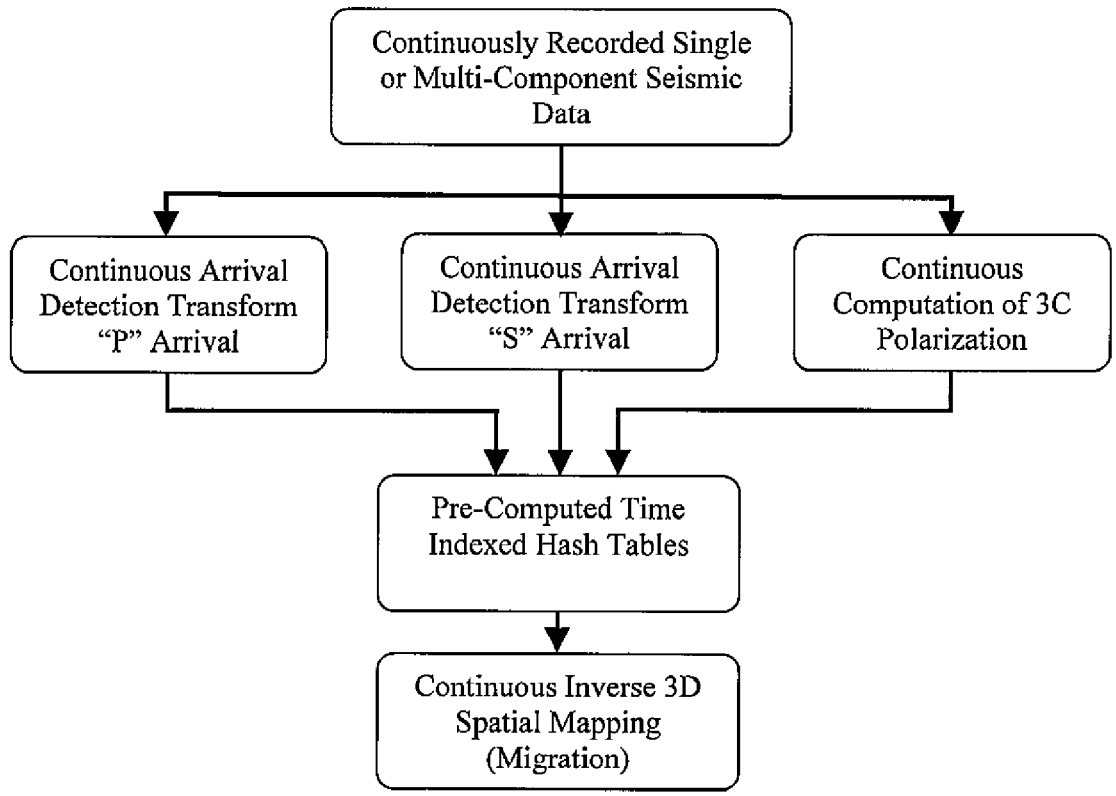
FIG. 4 is an expansion of the flowchart illustrated in FIG. 2 to include the use of hash tables according to one embodiment of the present invention.

The principles of the present invention are not limited to the specific methods described above. Variations of the methods described above may also be implemented, for example, to improve computation performance. One example of such a variation may be the use of hash tables to store pre-computed values prior to mapping as shown in FIG. 4. Using hash tables may reduce the 3D spatial mapping or migration to a simple sum of contributions from each of the seismic detectors. The use of hash tables is well known to those of skill in the art having the benefit of this disclosure for computational code optimization and other uses.

Figure 5:
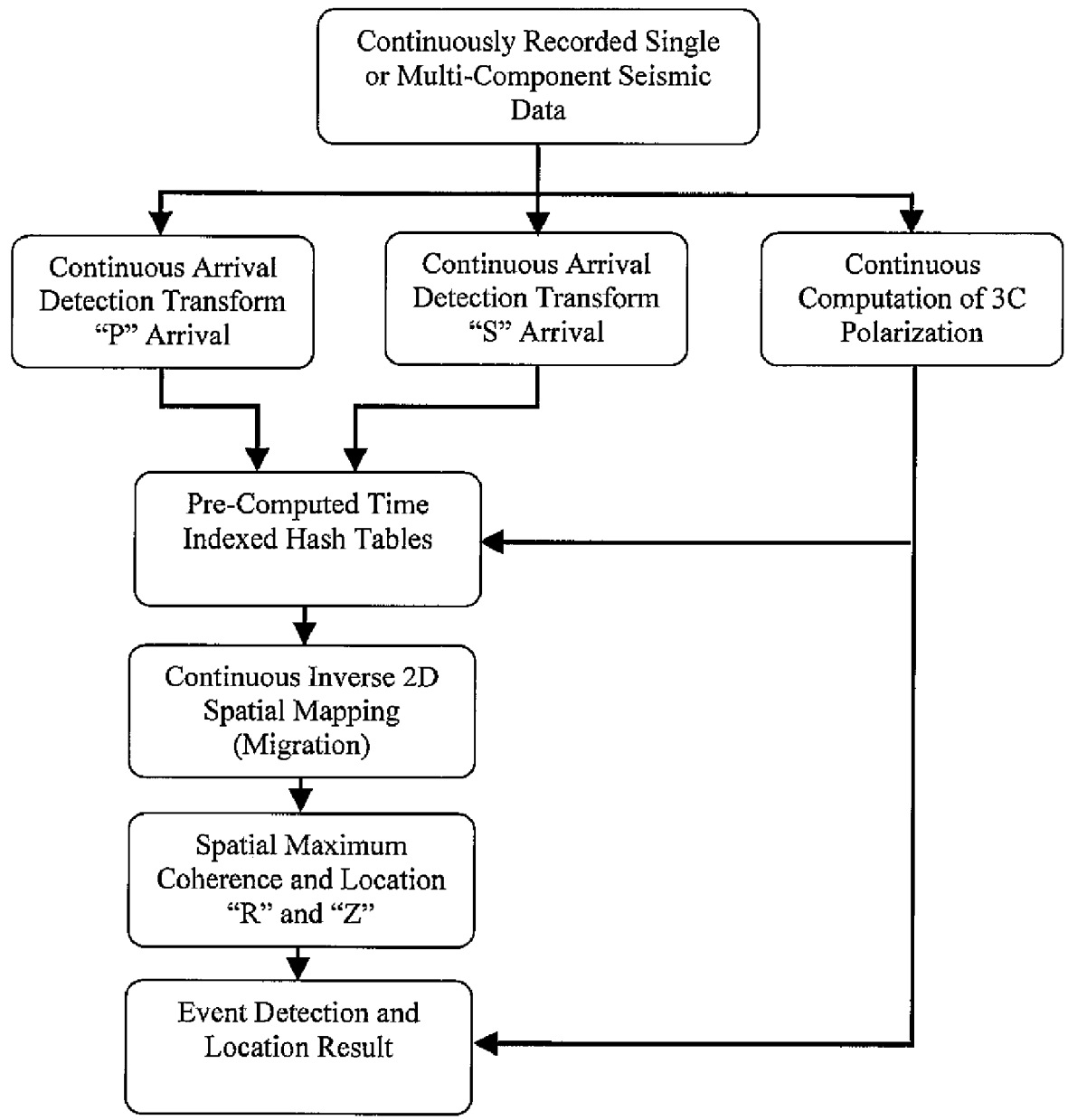
FIG. 5 is an expansion of the flowcharts illustrated in FIGS. 1 and 4 to include a spatial maximum coherence and location function according to one embodiment of the present invention.

Another variation incorporating methods of the present invention is illustrated by the flowchart of FIG. 5. If the seismic detectors of a microseismic monitoring system exist as a single vertical array of sensors, using cylindrical coordinates, a method can be implemented to efficiently map and determine event location using only 2D mapping. The 2D mapping is done as a function of R, which is defined as the distance from the array, and position Z. If an event detection occurs at time Te, which is the time of maximum coalescence of the 2D mapping, the mapping also determines the distance R and the position Z of the event. The azimuth angle of the event relative to the array can then be determined from the polarization analysis for the arriving P wave.

The methods described above have been implemented to monitor microseismic events as described below. A signal recorded by a vertical array of eight three-component seismic sensors was analyzed. The 3C waveforms were projected to a nominal P polarization and Sh polarization based on the geometry, sensor orientation, and anticipated arrival direction of microseismic energy. The nominal P and Sh waveforms were detection transformed using a Hilbert envelope STA/LTA detection criteria. Using a ray-traced modeled travel time and ray direction lookup tables, the recorded data was migrated to update a 3D volume (spatial map) on a continuous basis using the methods described above.

The general form of the map can be considered 1D, 2D, or 3D. A 2D map may be constructed from multiple 1D maps, and a 3D map may be constructed from multiple 2D maps. The spatial coordinates of the map may be position, distance, or location in one, two, or three dimensions.

In the case of a homogeneous spatial velocity model, the translation of a "time" coordinate to a spatial or distance coordinate is a simple scalar (velocity). Therefore, in such a case the "time" coordinate is considered equivalent to a "spatial coordinate."

As the map is time evolving, it is difficult to show or display the result of the map with static figures. The exception is a 1D map. The 1D map can be shown graphically as a 2D image of the time evolution. To display a 2D map requires plotting a changing surface, and a 3D map requires a changing volume plot. Therefore, the evolving map is described below with multiple static snapshots. A 1D map of the result of the signal for a single seismic detector may be a trivial map. For completeness, a snapshot of the trivial 1D map for a single seismic detector is shown in FIG. 6. The 1D map is a plot of a time evolving measure of a seismic signal, where the measure of the signal is a representation of the measure of interest. However, this is a trivial map and of minor interest.

Any multiple measure of the signal of interest (from one or more seismic detectors) may be mapped as a map of coalescence. According to the present invention, a map of coalescence is historical and time evolving. In the simple 1D example of a signal as recorded by a single seismic detector, the signal may be interpreted as a measure of both a P-wave and an S-wave. The map of coalescence is then generated based on these measures.

P and S-waves travel at different speeds Therefore, the spatial coordinate is either measured in distance or measured in time referring to either P velocity or S velocity. According to the example shown in FIG. 7A-7C, the signal is mapped twice using a single detector, once using the P velocity 730, and once using the S velocity 732. The signal may contain P-waves 734 and S-waves 736 at both velocities. FIGS. 7A-7C illustrate three time snapshots of the evolving map. FIG. 7A illustrates a snapshot in time prior to coalescence. FIG. 7B illustrates the time of coalescence wherein the measured waves coalesce at a point 740. FIG. 7C shows the map after coalescence. As this is a process of "putting" the signal back to its spatial origin (time or distance), this might be described as a process of migration, as the term "map migration" has been used herein. The time evolution of the map of FIGS. 7A-7C shows the P-wave 730 and the S-wave 732 traveling at different speeds. The net result or map of coalescence is the time evolving resultant contribution of the two waveforms. The contribution of the P-wave 730 and the S-wave 732 may be a simple sum or product of the two signals, or some function the makes a quantitative measure of the contribution of the two signals.

When the one or more seismic sensors comprise a 3C or other multi-component detector, seismic P-wave signals 830 and S-wave signals 832 shown in FIGS. 8A-8C also have a measure of waveform polarization. P-waves and S-waves have different polarization. Therefore, a function of coalescence that takes into account the waveform polarization may be constructed. Such a function would only exhibit coalescence when a likely P and S-wave coincide (as shown in FIG. 8B), and not when two P waves or two S waves coincide. At a point of coincidence 840, an occurrence is P+S energy occurs at a correct distance and time. Accordingly, incidental coalescence of two P-waves or two S-waves that may result, for example, from two independent seismic events, can be excluded.

In addition to or alternative to P-wave and S-wave coalescence, the methods of the present invention also contemplate spatial coalescence of signals for multiple seismic sensors at different locations. Measuring a unique location in 2D for a single phase (either a P signal or an S signal) requires a minimum of three seismic sensors. For a unique location in 3D, a minimum of four sensors may be required. The time evolution of the map is the measure of coalescence which is the measure of interest.

Figure 9A:
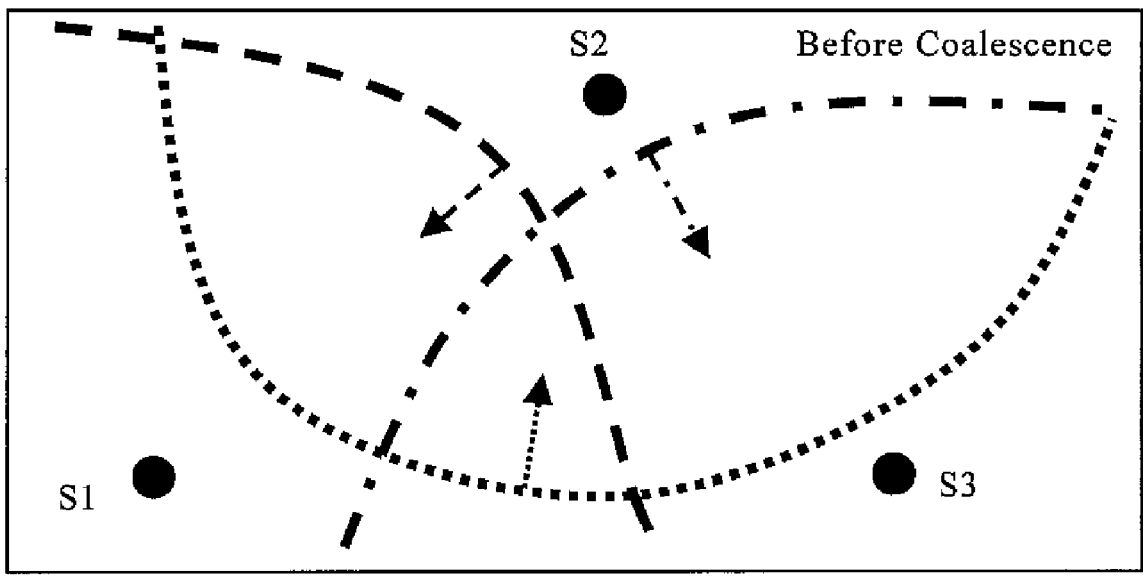
FIG. 9A is snapshot of a time evolution map mapping a seismic signal measured by three sensor locations before maximum coalescence according one aspect of the present invention.
Figure 9B:
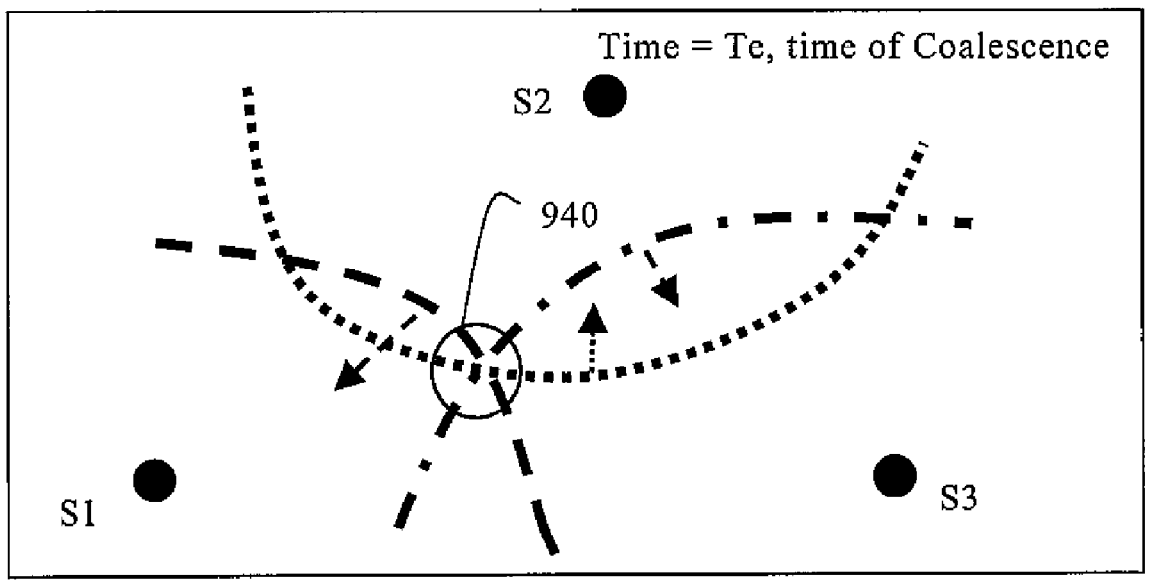
FIG. 9B is a snapshot of the time evolution map of FIG. 9A at maximum coalescence.

The 2D (or 3D) map can be generated by interpreting and mapping the signals as P only, S only, or P+S. The map can be generated by directly mapping the signals, or the signals may be efficiently mapped making use of 1D time-indexed maps generated for each of the single or multi component sensors. Time indexed 1D maps are termed "hash tables." The hash tables may pre-compute a measure of the P+S coalescence for each detector and thereby simplify the computation of the 2D or 3D spatial coalescence map. FIGS. 9A-9B illustrate spatial coalescence mapping with three sensor locations, S1, S2, and S3. FIG. 9A illustrates a time snapshot of traveling waveform signals before coalescence, and FIG. 9B illustrates a plot at time=Te, the time of coalescence, wherein the waveforms come together at a point 940.

A 2D or 3D map may be generated, which may be considered to be multiple 1D maps. Additionally, the 2D and 3D maps may sum the contributions from multiple seismic detectors and form a 2D or 3D map of coalescence. In the case of multiple seismic detectors spatially separated at different sensor locations such as the case illustrated in FIGS. 9A-9B, the time evolving 2D or 3D map of coalescence of any measure of the signal may be of interest. The mapping of a function of coalescence of measures of a seismic signal, as they relate to P-wave only, S-wave only, or both P and S-wave modes, results in a map showing the coalescence of the contributions from the multiple detectors. The time evolution of the coalescence map yields the microseismic events of interest.

The description above related to coalescence mapping, forward mapping, or "delayed" forward mapping of coalescence relates to the time evolution of the map in a forward direction (time increasing). The "delay" relates to generating a real-time map (as data is recorded) at a time delay equivalent to the time of travel from the furthermost distance covered by the map However, a reverse map of coalescence may also be generated. With a reverse map of coalescence, time is run in reverse. The resultant map may be mathematically equivalent to the forward map (but played in reverse), or it may be mathematically different. According to the examples above, a recursive function involving a time constant Tc is used. A recursive function implies that the next time step depends on a previously computed result. Thus, the resultant set of forward and reverse maps would not be equivalent.

Figure 10A:
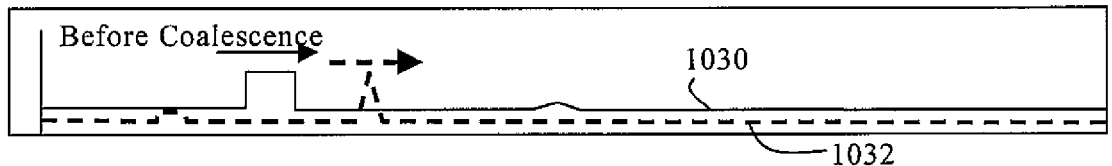
FIG. 10A is an example of a reverse time evolution map prior to maximum spatial coalescence using a multiple seismic detectors according to one aspect of the present invention.
Figure 10B:
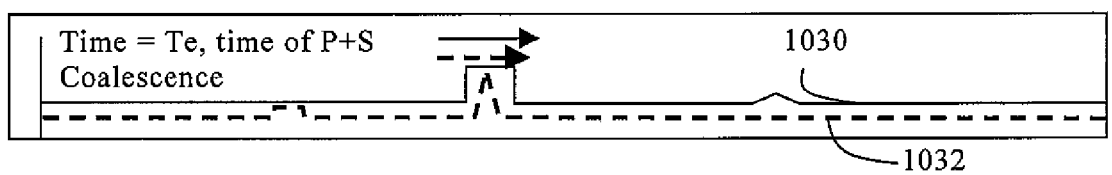
FIG. 10B is the reverse time evolution map of FIG. 10A at maximum spatial coalescence.
Figure 10C:
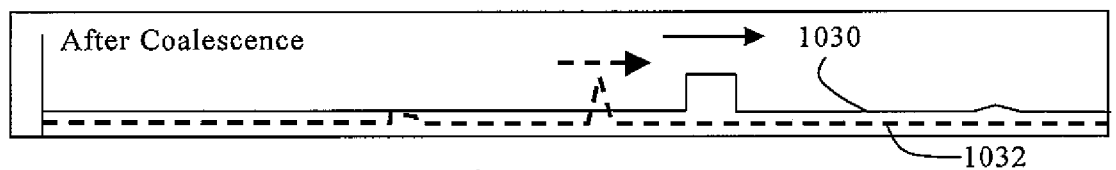
FIG. 10C is the reverse time evolution map of FIG. 10A after maximum spatial coalescence.

A reverse generated map implies that it is not available in real-time (i.e., it can only be generated after the data has been acquired). Nevertheless, real-time may be available if the map is "played back" or computed over short time windows of data of interest, on a continuous forward time basis. FIGS. 10A-

10C illustrate a reverse time evolution of the map of coalescence of P and S-waves 1030, 1032.

The continuous maps disclosed herein may be displayed for operators in any number of ways. The displays may be different depending on the number of map dimensions. Examples of one, two, and three-dimensional mapping display techniques are described below.

Display of a 1D may be a time evolving map as described above. Additionally, it is possible to capture the time evolution of the map as a 2D image. For example, the horizontal axis may be defined as a 1D spatial coordinate, and the vertical axis may be defined as the time evolution of the map. Accordingly, the value or measure of coalescence may be represented as a color, density, or contour, or 2D surface having height.

Figure 11A:
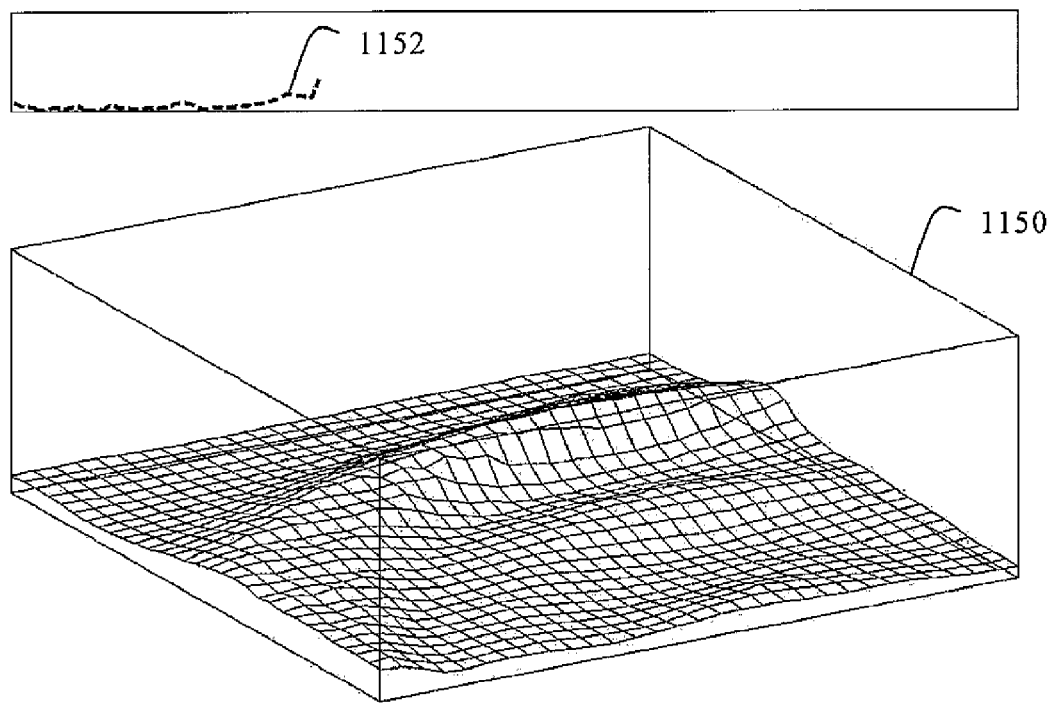
FIG. 11A an example of a cross-sectional snapshot of a 3D spatial map showing the spatial coalescence just prior to a maximum of a combined mapped event detection criteria and waveform polarization analysis for an eight level array of three-component sensors according to one embodiment of the present invention.
Figure 11B:
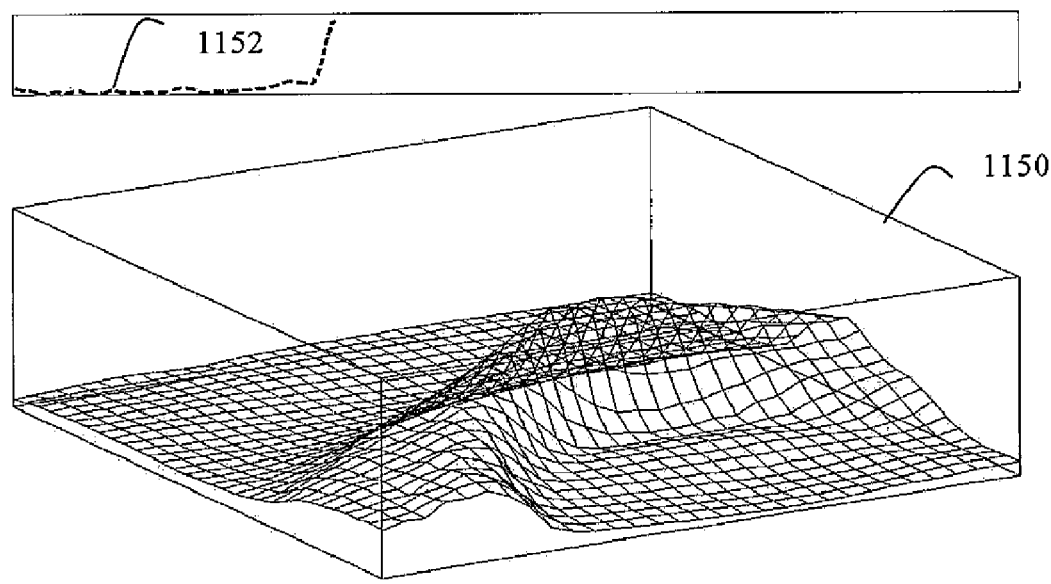
FIG. 11B is a snapshot according to FIG. 11A at maximum coalescence.
Figure 11C:
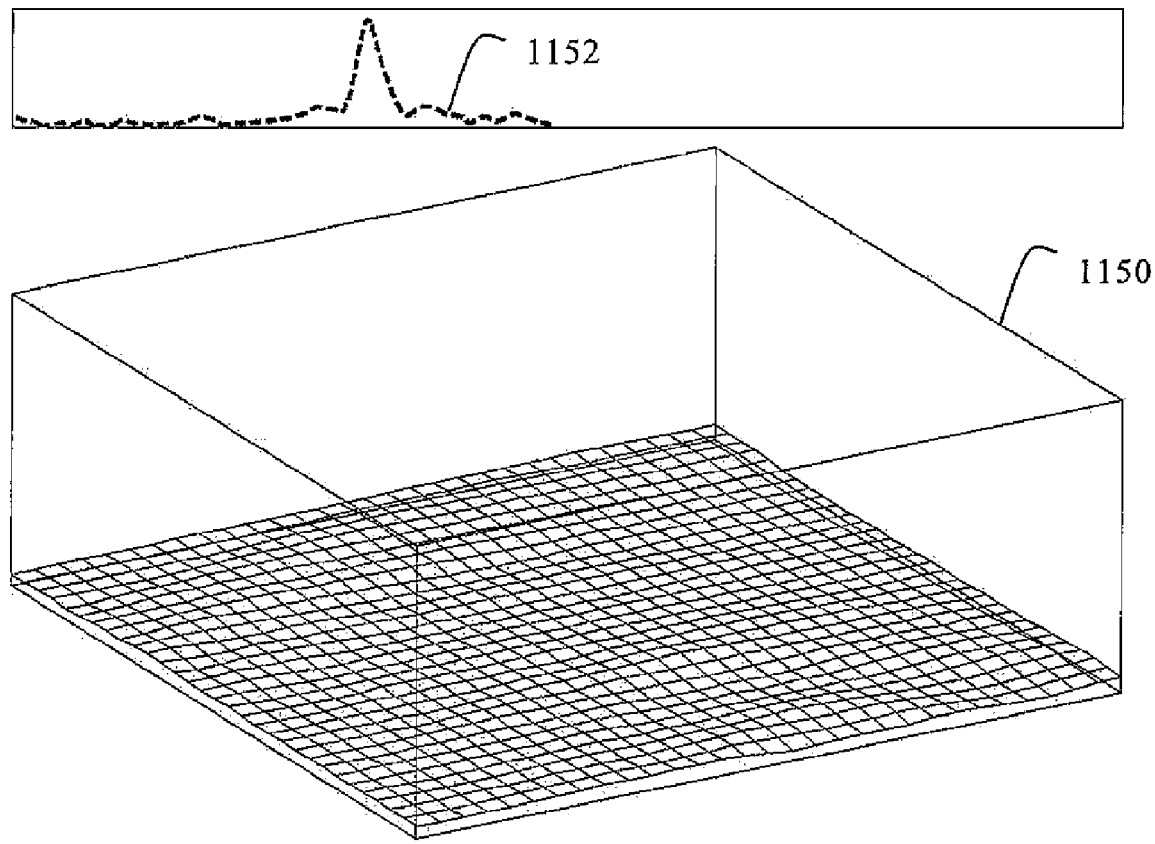
FIG. 11C is a snapshot according to FIG. 11A after maximum coalescence.

A 2D map or display of a surface may only be easily displayed as an animation, or as a sequence of snapshots. Two axes of the surface represent the spatial coordinates, with the surface value (measure of coalescence) displayed, for example, as a color, density, contour, or as a 2D surface having height. The value of the surface changes with time. The time evolution of the maximum values of coalescence may be captured and displayed in a simple plot. FIGS. 11A-11C illustrate one exemplary map of coalescence 1150 generated by mapping processed signals 1152 measured, for example, by an array of eight 3C seismic sensors. FIGS. 11A-11C illustrate, respectively, a snapshot just before coalescence, at coalescence, and after coalescence.

One way to display a 3D map is a time evolving iso-surface. For example, the iso-surface enclosing a volume representing the highest ten percent measure of coalescence may be shown. The value of coalescence may be displayed as a color or by opacity. The time evolution of the 3D spatial map is a visible representation of the 3D spatial measure of coalescence, and may be automatically interpreted as the 3D spatial measure of microseismicity.

The microseismicity may be defined as either a P-wave seismic source, an S-wave seismic source, or a measure of P and S only seismic sources. Where the measure of coalescence can be quantified, the resultant map may be used quantitatively as a measure of the probability of a source of seismic energy as revealed by the experiment, being the measurement, mapping and interpretation.

Figure 12A:
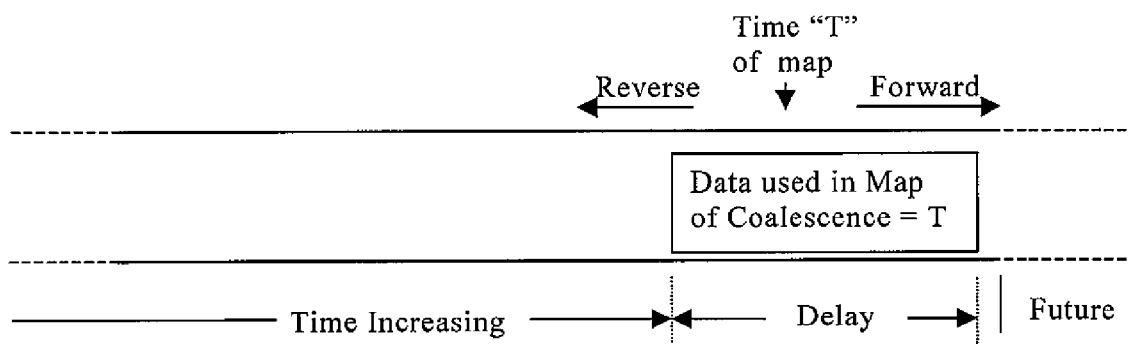
FIG. 12A illustrates a process of computing a continuous map of coalescence according to one aspect of the present invention.
Figure 12B:
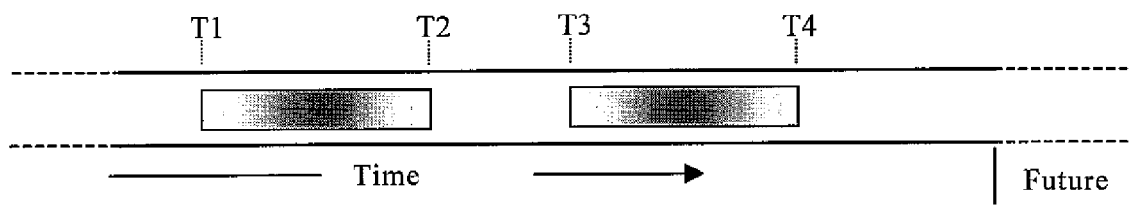
FIG. 12B illustrates a process of computing an evolving map of coalescence over short time windows of interest.

Maps of coalescence are displayed here left-to-right as the natural direction of increasing forward time. FIG. 12A depicts a process of computing a continuous delayed forward map of coalescence. At the left of FIG. 12A, there will be a starting point representing a start to recording data. At the right will be an end point, at which time recording ceases. Time "T" therefore increases from left to right. Alternatively, an equivalent reverse time coalescence map may be computed following the recording of all data of interest. Moreover, according to some embodiments a map of coalescence relating to recorded data may be generated over short time-windows of interest. For example, as shown in FIG. 12B, coalescence maps may be generated in a first window defined between times T1 and T2, and second window defined between times T3 and T4. The time evolving map of coalescence may be computed over short or long windows either forward or backward.

Figure 13:
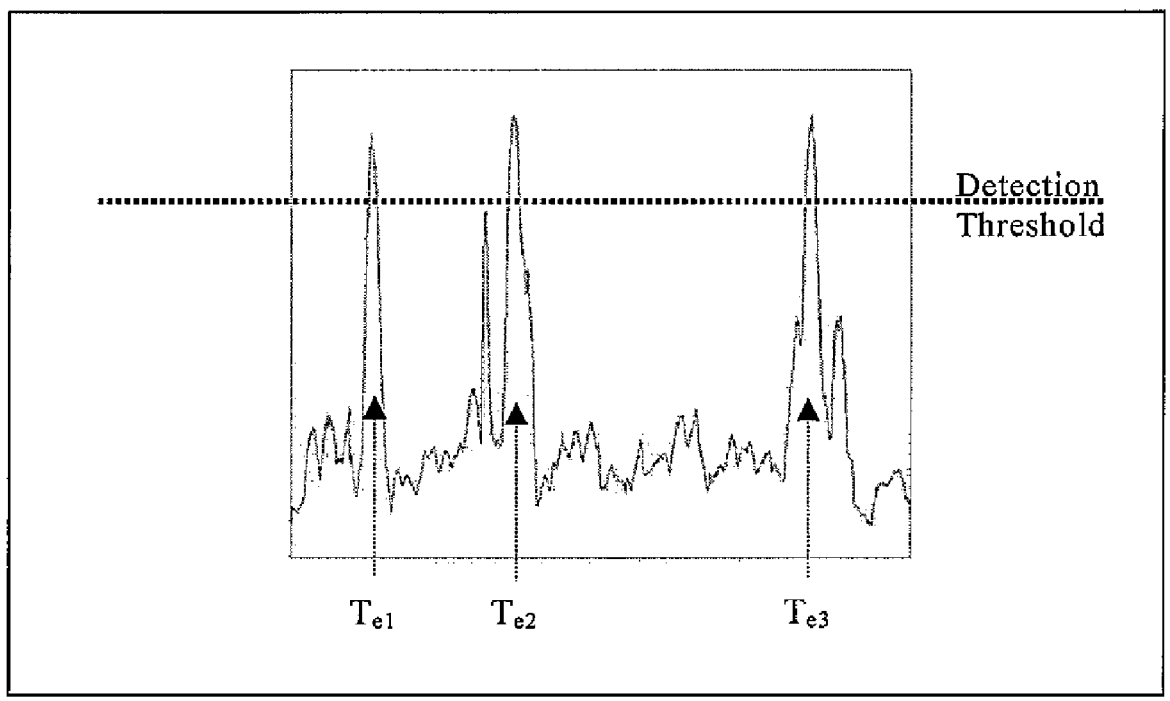
FIG. 13 is an example of a plot of the time evolution of the spatial maximum coherency according to one embodiment of the present invention.

The maximum coherency or coalescence value at each time step and its location are recorded as discussed above as a 1D, 2D, or 3D map of coalescence. For the map of coalescence, events are identified as shown in FIG. 13. FIG. 13 is an exemplary plot of the time evolution of the spatial maximum coherency. Three microseismic events are identified as Te1, Te2, and Te3 in FIG. 13. The times Te1 correspond to the most likely times of the events as determined from the analysis (mapping) of the recorded data.

It will be understood by those of skill in the art having the benefit of this disclosure that the descriptions herein for generating a map of coalescence from raw recorded signals are exemplary. Numerous methods of signal analysis prior to mapping may also be applied, includes processes of detection transformation according to principles of the present invention. Measures of the signal may be related to measures of energy (amplitude), rectilinearity, or changes in signal frequency content. Moreover, there may be measures of P and S-wave signals in addition to waveform polarization, including analysis of frequency content.

Figure 14:
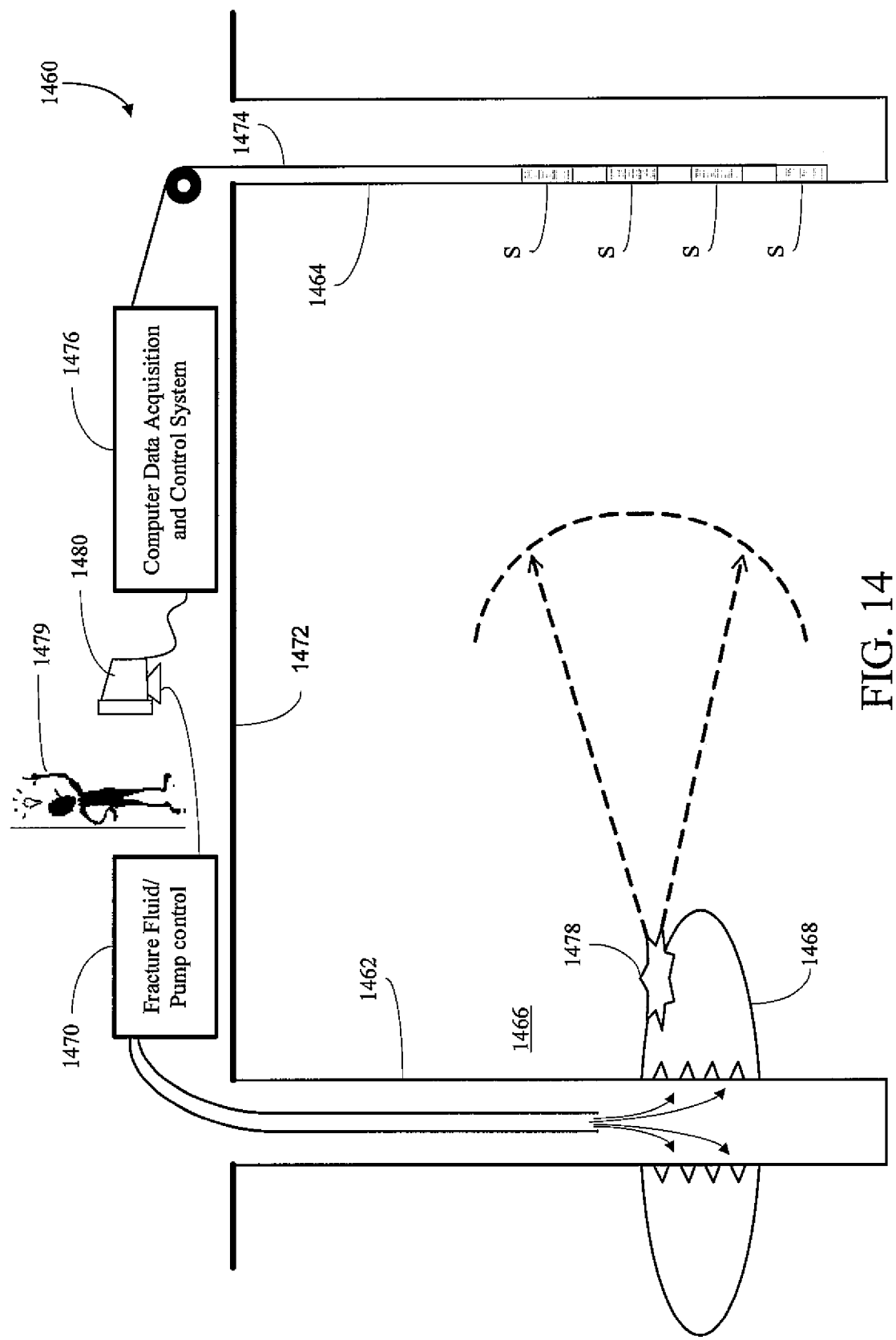
FIG. 14 illustrates a seismic monitoring system and a hydraulic fracturing system according to one embodiment of the present invention.

The methods and systems described above may be implemented in real time, for example, by a hydraulic fracture and monitoring system 1460 shown in FIG. 14. The hydraulic fracture and monitoring system 1460 system is preferably arranged with respect to a first and a second wellbore 1462, 1464. The first wellbore 1462 traverses a formation 1466 with a zone 1468 that is scheduled for hydraulic fracture. A hydraulic fracture apparatus 1470 comprising a fracture fluid, a pump, and controls is coupled to the first wellbore 1462. The second wellbore 1464 contains a one or more, and preferably a plurality, of temporary or permanent seismic sensors S. Alternatively, the sensors S may be placed along a surface 1472 or within the first wellbore 1462. A communication cable such a telemetry wire 1474 facilitates communication between the sensors S and a computer data acquisition and control system 1476. As a fracture job commences, fracture fluid is pumped into the first wellbore 1462, creating microseismic events 1478 as the zone 1468 cracks and propagates. The microseismic events 1478 create seismic waves that are received by detectors of the sensors S.

The seismic signals received by the sensors S may be used to monitor and map microseismic events caused by the fracture operation. Accordingly, based on the seismic signals received, computers, such as the computer data acquisition and control system 1476, may run programs containing instructions, that, when executed, perform methods according to the principles described herein. Furthermore, the methods described herein may be fully automated and able to operate continuously in time for monitoring, detecting, and locating microseismic events. An operator 1479 may receive results of the methods described above in real time as they are displayed on a monitor 1480. The operator 1479 may, in turn, adjust hydraulic fracture parameters such as pumping pressure, stimulation fluid, and proppant concentrations to optimize wellbore stimulation based on the displayed information relating to detected and located seismic events.

The preferred aspects and embodiments were chosen and described in order to best explain the principles of the invention and its practical application. The preceding description is intended to enable others skilled in the art to best utilize the invention in various aspects and embodiments and with various modifications as are suited to the particular use contemplated. The description may be implemented in any microseismic measurement system, particularly for hydraulic fracture monitoring. In addition, the methods may be programmed and saved as a set of instructions, that, when executed, perform the methods described herein. It is intended that the scope of the invention be defined by the following claims.

What is claimed is:

1. A method of detecting and locating a microseismic event, comprising:
   providing an estimate of space for a location of a source;
   providing an estimate of a velocity model for a formation;

after providing the estimates, receiving data of a microseismic event with a first seismic sensor located on a tool in a wellbore;
receiving data of the microseismic event with a second seismic sensor located on the tool;
selecting an instant in time;
selecting a plurality of locations in the estimated space, wherein the estimated space is not between the first and second sensors;
utilizing the receiving data to determine a first break using forward modelled traveltimes;
determining, with a processor, whether the data received by the first sensor and the data received by the second sensor coalesce at any of the selected locations at the instant; and
determining, with a processor, the location of the source.

2. A method according to claim 1, wherein the estimate of space is at least partially based on a relative location to a tool.

3. A method according to claim 2, wherein the estimate of space is at least partially based on a relative location of the tool to a known area in a subterranean formation undergoing hydraulic fracturing.

4. A method according to claim 3, wherein the hydraulic fracturing is occurring in a second wellbore and the receiving is occurring in a first wellbore.

5. A method according to claim 4, wherein the receiving is at least partially occurring above the hydraulic fracturing.

6. A method according to claim 1, wherein the first and second seismic sensors each receive at least one of a P-wave and an S-wave component resulting from the microseismic event.

7. A method according to claim 6, wherein the first and second seismic sensors each receive both the P-wave and the S-wave component.

8. A method according to claim 1, wherein the microseismic event occurs during a period of time recorded by both the first and second seismic sensors.

9. A method according to claim 1, wherein the first and second seismic sensors are located on the tool in the same plane.

10. A method according to claim 8, wherein the selected instant in time is the first instant of the period of time.

11. A method according to claim 1, wherein determining the location of the source includes at least one of determining a 2-D location and a 3-D location of the source.

12. A method according to claim 1, further including selecting a plurality of instances in time and selecting a plurality of locations in space for each of the instances in time.

13. A method according to claim 12, wherein determining the location of the source is based on the plurality of instances and the plurality of locations.

14. A method according to claim 12, further including generating a time evolving map of microseismic activity by spatial mapping the seismic data.

15. A method according to claim 1, further comprising reporting the microseismic events to a hydraulic fracture operator in real-time.

16. A method according to claim 1, wherein at least one of selecting an instant in time, selecting a plurality of locations in the estimated space, determining whether the data received by the first sensor and the data received by the second sensor coalesce at any of the selected locations at the instant, and determining the location of the source are fully automated.

17. A method according to claim 1, wherein selecting an instant in time, selecting a plurality of locations in the estimated space, determining whether the data received by the first sensor and the data received by the second sensor coalesce at any of the selected locations at the instant, and determining the location of the source are all fully automated.

18. A method of detecting and locating a microseismic event, comprising:
providing an estimate of space for a location of a source of the microseismic event, the estimate being at least partially based on a estimated relative location of a tool and the microseismic event;
providing an estimate of a velocity model for a formation;
receiving data of the microseismic event with a first and a second seismic sensor located on the tool in a wellbore, the data including at least a P-wave and an S-wave component;
selecting at least a first and a second instant in time;
utilizing the receiving data to determine a first break using forward modelled traveltimes;
attempting, with a processor, to coalesce the signal received by the first and second sensors at the first instant in time at a plurality of locations in the space;
attempting, with a processor, to coalesce the signal received by the first and second sensors at the second instant in time at a plurality of locations in the space;
coalescing the signal received by the first and the second sensors; and
determining the location of the source.

19. A method according to claim 18, wherein selecting at least a first and a second instant in time, attempting to coalesce the signals, coalescing the signal received by the first and the second sensors, and determining the location of the source are all fully automated.

20. A method according to claim 18, wherein the estimate of space is at least partially based on a relative location of the tool to a known area in a subterranean formation undergoing hydraulic fracturing.

21. A method according to claim 20, wherein the hydraulic fracturing is occurring in a second wellbore and the receiving is occurring in a first wellbore.

22. A method of detecting and locating a microseismic event, comprising:
providing an estimate of space for a location of a source of the microseismic event;
providing an estimate of a velocity model for a formation;
after providing the estimates, receiving data of the microseismic event with a first and a second seismic sensor located on a tool in a wellbore;
automatically selecting at least a first and a second instant in time;
automatically utilizing the receiving data to determine a first break using forward modelled traveltimes;
automatically attempting, with a processor, to coalesce the signal received by the first and the second sensors at the first instant in time at a plurality of locations in the space;
automatically attempting, with a processor, to coalesce the signal received by the first and the second sensors at the second instant in time at the plurality of locations in the space;
automatically coalescing the signal received by the first and the second sensors; and
automatically determining the location of the source, wherein the location is not between the first and second sensors.

* * * * *